United States Patent
Lewis et al.

(10) Patent No.: US 11,176,010 B2
(45) Date of Patent: Nov. 16, 2021

(54) CIRCUIT-CYCLE REPRODUCTION

(71) Applicant: International Business Machines Corporation, Armonk, NY (US)

(72) Inventors: Daniel Lewis, Bangalore (IN); Diyanesh B. Chinnakkonda Vidyapoornachary, Bangalore (IN); Sean Dalton, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 234 days.

(21) Appl. No.: 16/384,026

(22) Filed: Apr. 15, 2019

(65) Prior Publication Data

US 2020/0327026 A1  Oct. 15, 2020

(51) Int. Cl.
*G06F 11/00* (2006.01)
*G06F 11/26* (2006.01)
*G06F 11/22* (2006.01)

(52) U.S. Cl.
CPC .......... *G06F 11/26* (2013.01); *G06F 11/2236* (2013.01)

(58) Field of Classification Search
CPC .............. G06F 11/008; G06F 11/2242; G06F 11/2236; G06F 11/3688; G06F 11/0754; G06F 11/273; G06F 11/2733; G06F 11/26
See application file for complete search history.

(56) References Cited

U.S. PATENT DOCUMENTS

| | | | | |
|---|---|---|---|---|
| 3,257,546 | A * | 6/1966 | McGovern | G06F 11/2215 714/703 |
| 5,598,072 | A * | 1/1997 | Lambert | B60L 7/003 318/376 |
| 5,892,897 | A | 4/1999 | Carlson et al. | |
| 6,079,038 | A * | 6/2000 | Huston | G01R 31/31711 714/724 |
| 6,567,924 | B1 * | 12/2003 | McCravy | B42D 5/042 368/28 |
| 7,254,509 | B1 * | 8/2007 | Johnson | G01R 31/3187 702/117 |
| 7,404,110 | B1 * | 7/2008 | Johnson | G06F 11/263 714/700 |
| 7,703,076 | B1 * | 4/2010 | Kocot | G06F 11/3664 717/125 |

(Continued)

FOREIGN PATENT DOCUMENTS

WO 2012087330 A2 6/2012

*Primary Examiner* — Amine Riad
(74) *Attorney, Agent, or Firm* — Cantor Colburn LLP; Bryan Bortnick

(57) ABSTRACT

A circuit-cycle fault reproduction system includes a hardware processor configured to execute at least one computing cycle corresponding to a given number instructions. A cycle tracking unit is configured to identify at least one test cycle included in a range of computing cycles starting from at a start cycle and completing at an end cycle. A fail cycle detection unit is in signal communication with the cycle tracking unit. The fail cycle detection unit is configured to identify a failed cycle among the plurality of test cycles based on a cycle difference between the starting cycle and the ending cycle, and to actively modify the range of computing cycles based on a comparison between the cycle difference and a cycle difference threshold value.

15 Claims, 5 Drawing Sheets

(56) References Cited

U.S. PATENT DOCUMENTS

| | | | |
|---|---|---|---|
| 8,239,833 B2* | 8/2012 | Teglia | G06F 21/552 |
| | | | 717/126 |
| 8,595,554 B2 | 11/2013 | Bellofatto et al. | |
| 9,286,423 B2 | 3/2016 | Asaad et al. | |
| 9,626,265 B2 | 4/2017 | Klazynski et al. | |
| 9,678,151 B2 | 6/2017 | Klazynski et al. | |
| 9,852,037 B2 | 12/2017 | Klazynski et al. | |
| 2009/0006894 A1 | 1/2009 | Bellofatto et al. | |
| 2014/0281735 A1* | 9/2014 | Olivarez | G06F 11/2242 |
| | | | 714/40 |
| 2016/0377680 A1* | 12/2016 | Klazynski | G01R 31/3177 |
| | | | 714/736 |

* cited by examiner

CIRCUIT-CYCLE REPRODUCTION

BACKGROUND

The present invention generally relates to hardware processor validation techniques, and more specifically, to processor core debugging.

When validating hardware processor, debugging fails may be used to determine the root cause of an error by repeatedly executing a fail test typically referred to as cycle reproduction. Cycle reproduction involves repeatedly executing a fail test in a cycle-reproducible environment to collect cycle-by-cycle latch data to create a multi-cycle trace of a chiplet's various latch states. This debug method relies on a design's reproducibility behavior within chiplet bounds and functions that enable executing the design for a given number of cycles.

SUMMARY

Embodiments of the present invention are directed to a circuit-cycle fault reproduction system. The circuit-cycle fault reproduction system includes a hardware processor configured to execute at least one computing cycle corresponding to a given number instructions. A cycle tracking unit is configured to identify at least one test cycle included in a range of computing cycles starting from at a start cycle and completing at an end cycle. A fail cycle detection unit is in signal communication with the cycle tracking unit. The fail cycle detection unit is configured to identify a failed cycle among the plurality of test cycles based on a cycle difference between the starting cycle and the ending cycle, and to actively modify the range of computing cycles based on a comparison between the cycle difference and a cycle difference threshold value Embodiments of the present invention are directed to a computer-implemented method for performing a circuit-cycle fault reproduction process. The method comprises executing, via a hardware processor, at least one computing cycle corresponding to a given number instructions, and identifying, via a cycle tracking unit, at least one test cycle included in a range of computing cycles starting from at a start cycle and completing at an end cycle. The method further comprises actively modifying the range of computing cycles based on a comparison between a cycle difference and a cycle difference threshold value, the cycle difference calculated as a difference value between the starting cycle and the ending cycle, and identifying, via a fail cycle detection unit, a failed cycle among the range of computing cycles based on a cycle difference.

Embodiments of the invention are directed to a computer program product for clustering test case failures, the computer program product comprising a computer readable storage medium having program instructions embodied therewith. The program instructions are executable by a processor to cause the processor to perform a method for performing a circuit-cycle fault reproduction process. The method comprises executing, via a hardware processor, at least one computing cycle corresponding to a given number instructions, and identifying, via a cycle tracking unit, at least one test cycle included in a range of computing cycles starting from at a start cycle and completing at an end cycle. The method further comprises actively modifying the range of computing cycles based on a comparison between a cycle difference and a cycle difference threshold value, the cycle difference calculated as a difference value between the starting cycle and the ending cycle, and identifying, via a fail cycle detection unit, a failed cycle among the range of computing cycles based on a cycle difference.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
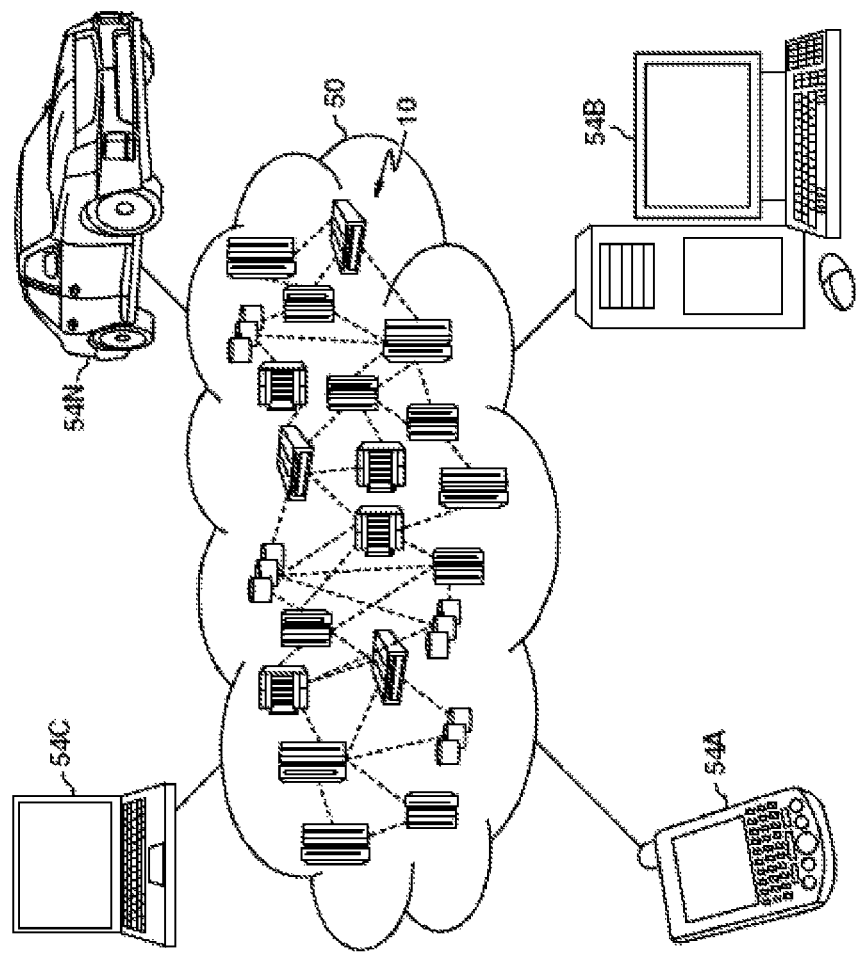
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Turning now to an overview of technologies that are more specifically relevant to aspects of the invention, conventional cycle reproduction techniques set the processor core in a "RunN" mode, which executes running cycles up to "N" number of instructions. The Nth cycle is usually the fault reported cycle; however, the actual fault occurred at a different cycle, e.g., the "Xth" cycle. Accordingly, a calculation of (N-X) cycles are the cycles of interest in terms of fault propagation.

For debugging purposes, the aim of the convention cycle reproduction technique is to determine the status of the processor's internal registers at a targeted number of cycles (e.g., "Y cycles") prior to the cycles of interest, i.e., prior to (N-X) cycles. In this manner, the Y through X cycles can be identified as a debug cycle window or debug cycle range of interest for recreating a failure of interest.

The internal register states at a given cycle(s) are referred to as "rings." These rings are collected at the debug cycle range of interest (i.e., Y through X) to obtain "debug rings" out of a debug run having a faulty core. Accordingly, the debug rings are collected for same cycles of interest to obtain traces that identify "golden rings" from a proper run on a non-faulty core. A comparison between the golden rings to the debug rings can then identify the occurrence of the first fault, e.g., the first divergence of latches.

The conventional cycle reproduction technique described above is suitable when the failures are primarily driven by logic functions. Substantial variability can occur, however, in terms of getting a consistent run when there are circuit triggered failures (e.g., temperature faults, droop, noise events that impact circuit path timings causing failure, etc.) which manifest as functional failures. These variabilities prevent all runs from being utilized as runs of interest (sometimes referred to as a run fault condition), and also may cause some runs to hit other circuit paths than the expected paths or signature paths. Consequently, the conventional cycle reproduction technique is not predicable and not fully reliable.

Various non-limiting embodiments described address the above-described shortcomings of the prior art by providing a computing system capable of performing a circuit-cycle fault reproduction (C2 repro) process that accounts for circuit variability conditions. The C2 repro process leverages a stable circuit, along with one or more real-time stability factors (e.g., electrical conditions, operating voltage, power consumption, temperature conditions and/or workload conditions) as a check criteria to determine targeted cycles of interest for performing cycle reproduction. The C2 repro process described herein is capable of accelerating the rate of fault convergence depending on the real-time stability factor (e.g., electrical conditions, operating voltage, power consumption, temperature conditions and/or workload conditions). For example, fault rate determined by the C2 repro process converges faster as the electrical conditions, operating voltage, power consumption, temperature conditions and/or workload conditions increase. Accordingly, the validity of the hardware processor is obtained in less time.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
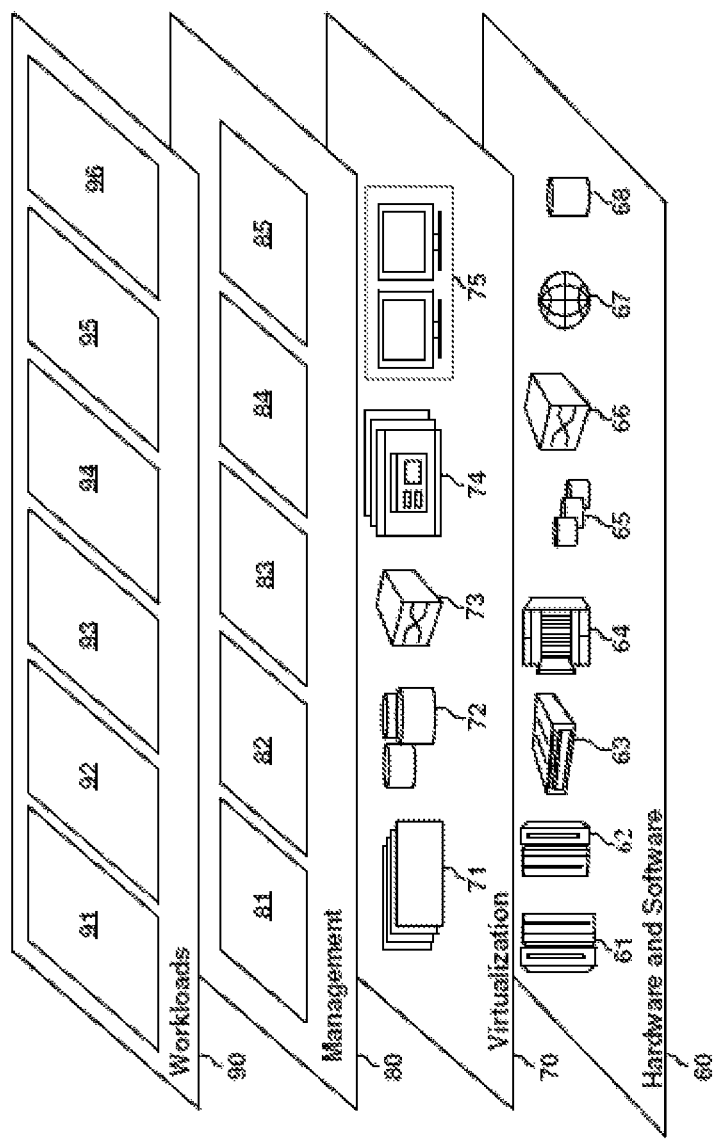
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and debugging processing 96.

Figure 3:
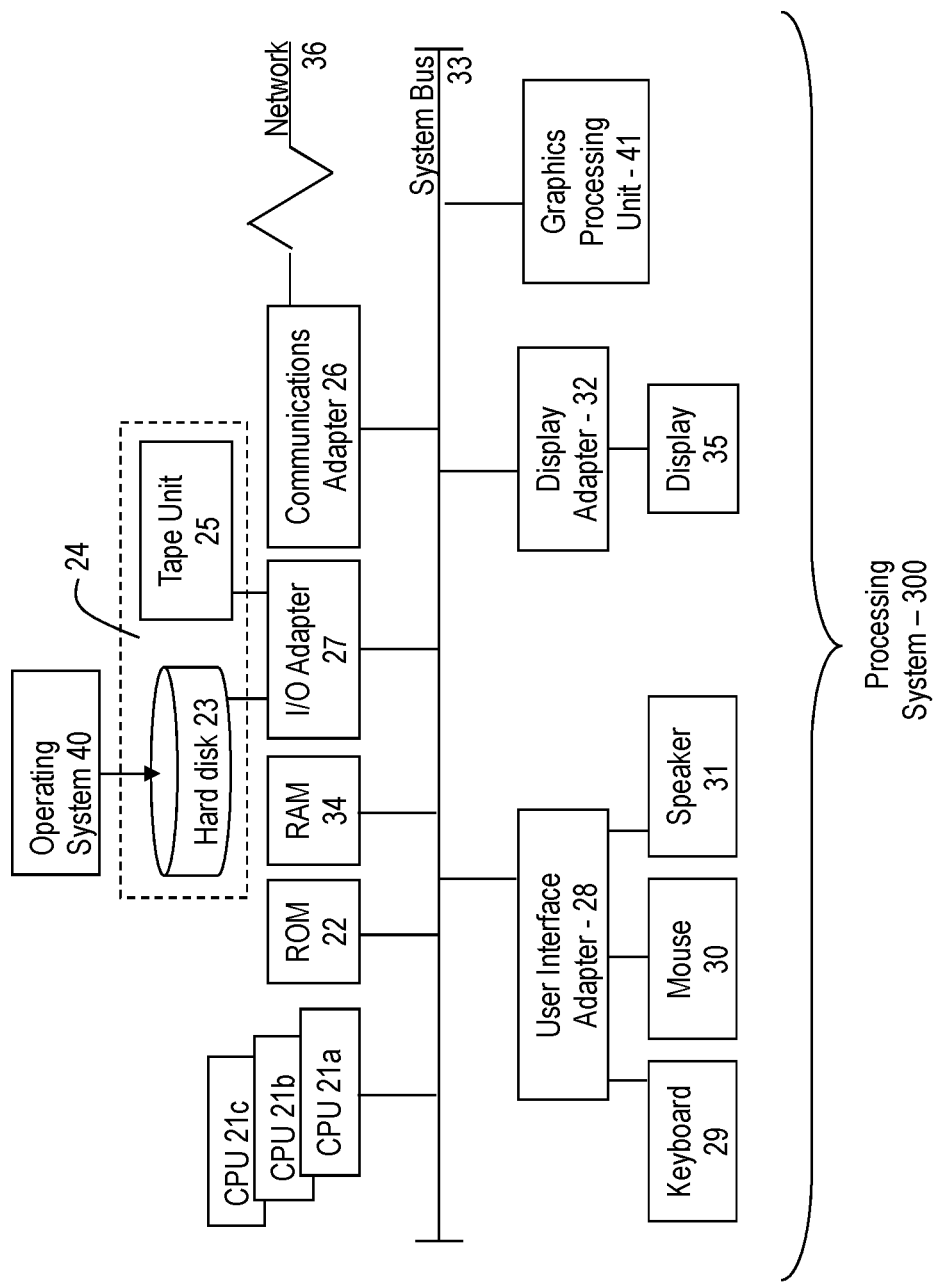
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21a, 21b, 21c). In one or more embodiments, each processor 21a, 21b, 21c may include a reduced instruction set computer (RISC) microprocessor. Processors 21a, 21b, 21c are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable 110 buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of one or more processors 21a, 21b, 21c, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

The present invention may be a system, a method, and/or a computer program product at any possible technical detail level of integration. The computer program product may include a computer readable storage medium (or media) having computer readable program instructions thereon for causing a processor to carry out aspects of the present invention.

Figure 4:
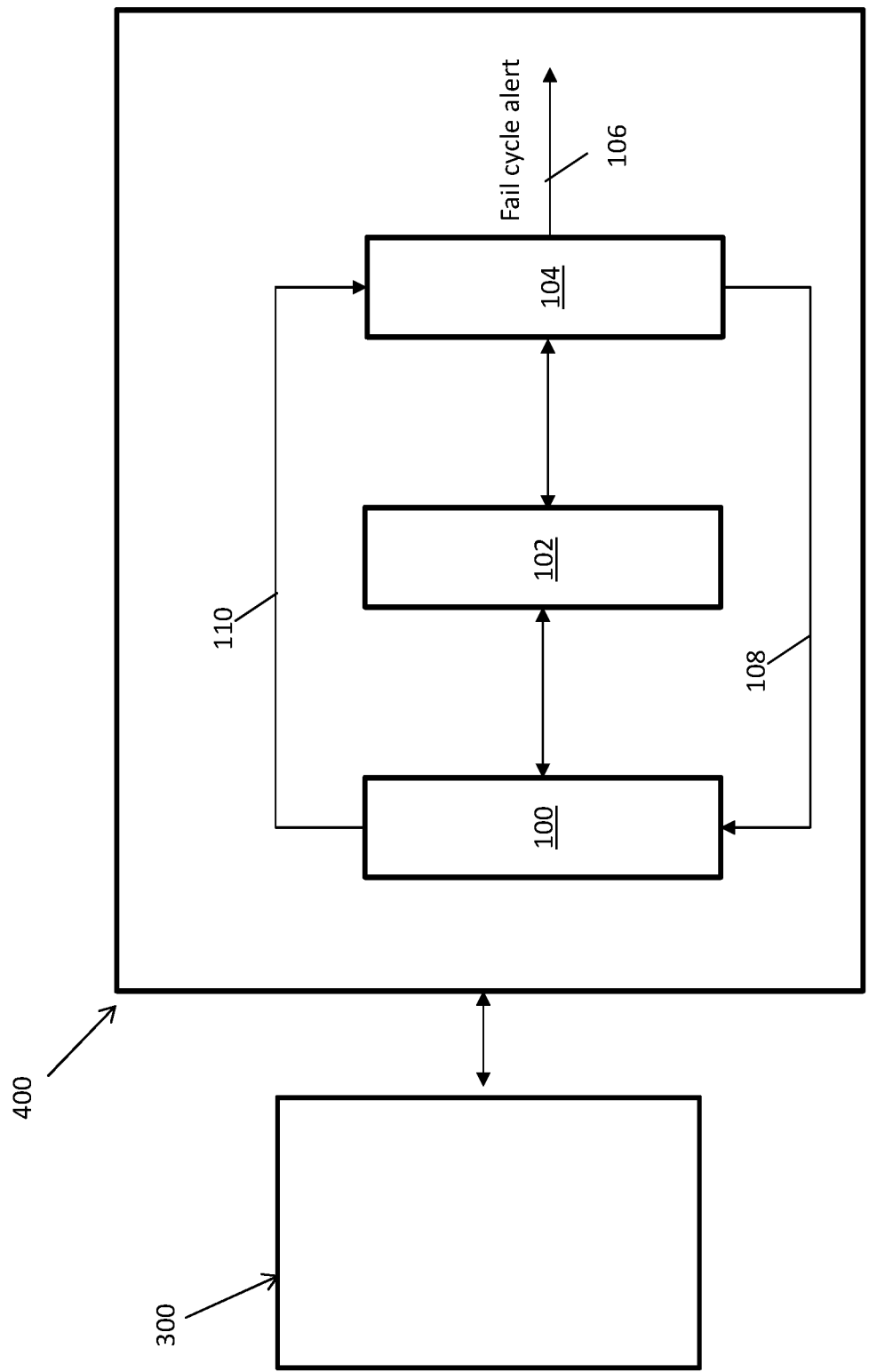
FIG. 4 depicts a block diagram of a circuit-cycle fault reproduction system according to one or more embodiments of the present invention.

Turning to FIG. 4, a processor 400 (e.g., a test processor) configured to perform a circuit-cycle reproduction (C2 repro) operation according to one or more embodiments of the invention. The processor 400 is in signal communication with a computer system 300, which is capable of invoking a "RunN" mode to run the test workload.

The processor 400 includes a cycle tracking unit 100, a memory unit 102, and a fail cycle detection unit 104. The cycle tracking unit 100 and fail cycle detection unit 104 can each be constructed as an electronic hardware controller that includes memory and a processor configured to execute algorithms and computer-readable program instructions stored in the memory. In addition, the cycle tracking unit 100, memory unit 102, and fail cycle detection unit 104 can all be constructed as a single sub-processor.

The cycle tracking unit 100 is configured to identify one or more running cycles corresponding to a given number (N) of instructions executed by the processor 400. Accordingly, the cycle tracking unit 100 is capable of detecting a failing cycle, along with selecting start and end cycles for performing the C2 repro operation. The cycle tracking unit is also capable of performing various arithmetic operations such as, for example, subtracting a first identified cycle from a second identified cycle.

The cycle tracking unit 100 is also configured to determine one or more stability factors (SF) of the processor 400, which are used as a check criteria to determine targeted cycles of interest for performing the C2 repro operation. The stability factors (SF) including, but are not limited to, electrical conditions, operating voltage, power consumption, temperature conditions and/or workload conditions of the processor 400. Accordingly, the cycle tracking unit 100 can set the number of ring-dump comparison iterations (n) based on the stability factor.

For example, when the cycle tracking unit 100 determines that the processor 400 is operating at 100 percent stability (e.g., low electrical workload and/or low workload, the cycle tracking unit 100 can set an expected stability (k) to 1, while also setting the iterations (n) to 1. When the cycle tracking unit 100 determines that the processor 400 is operating at 50 percent stability, the cycle tracking unit 100 can set the expected stability (k) to 5, while also setting the iterations (n) to 10. In this manner, the cycle tracking unit 100 can utilize the processor's real-time stability (e.g., its electrical conditions, operating voltage, power consumption, temperature conditions and/or workload conditions) as a check criteria to determine a targeted number cycles to perform the C2 repro operation.

In at least one non-limiting embodiment, the stability factor (SF) can be determined as ratio between a number of identified fail conditions (K) per a number of workload runs (N) for detecting the number of fail conditions, i.e., SF=K/N. Accordingly, when the SF is 1, for example, the expected stability (k) and the iterations (n) can both be set to 1. When, however, the SF is 0.5, for example, the expected stability (k) can be set to 5, while the iterations (n) can be set to 10.

After setting the expected stability (k) and the number of iterations (n), the cycle tracking unit 100 sets the start cycle (SC) to 0, and sets the end cycle (EC) to a detected failing cycle (FC). The cycle tracking unit 100 then sets the range of the test cycle (TC). This TC range is actively modified or tuned until a failed cycle is detected as described in greater detail below. In at least one non-limiting embodiment, test cycle range is set as: TC=(SC+EC)/2. Once setting the test cycle range, the cycle tracking unit 100 performs the number of ring-dump comparisons according to the set iterations (n). Accordingly, the cycle tracking unit 100 calculates a cycle differential ($\Delta C$) between n ring dumps with the golden dump and stores $\Delta C$ in the memory unit 102.

The fail cycle detection unit 104 accesses the memory unit to determine $\Delta C$, and to determine whether there is a difference between the ring dumps (i.e., whether $\Delta C$ does not equal zero). When there is no difference in the ring dump, the fail cycle detection unit 104 updates the SC value by setting it to the most recently set TC value. In this manner, the new SC value is brought closer toward the EC value. After updating the SC value, the fail cycle detection unit 104 calculates a difference between the updated SC value and the current EC value. When the difference between the updated SC and the EC is not greater than "1" (e.g., SC−EC equals "0"), the fail cycle detection unit 104 determines that the failing cycle has been identified. Accordingly, the fail cycle detection unit 104 outputs a fail cycle alert signal 106 identifying the detected fail cycle. In one or more embodiments, the fail cycle alert signal can be fedback to the computer system 300.

When, however, the fail cycle detection unit 104 determines that the difference between the updated SC and the current EC is greater than "1" (e.g., SC−EC is greater than "0"), the fail cycle detection unit 104 outputs a feedback signal 108 that instructs the cycle tracking unit 100 to update the TC value by commanding the cycle tracking unit 100 to set the SC to the most recently set TC value. Accordingly, the cycle tracking unit 100 again performs the debugging run described above, but according to an updated TC range.

Returning to the $\Delta C$ calculation, when are differences in the ring dump the fail cycle detection unit 104 performs a stability analysis to determine the stability of the processor 400. More specifically, the fail cycle detection unit 104 receives a stability factor indication signal 110 indicating the expected stability (k) and the number of iterations (n) values from the cycle tracking unit 100. When the value ΔC matches for expected stability (k) or more out of number of iterations (n), the fail cycle detection unit 104 updates the EC value by setting it to the most recently set TC value. In this manner, the new EC value is brought closer toward the SC value.

After updating the EC value, the fail cycle detection unit 104 calculates a difference between current SC value and the updated EC. When the difference between the SC and the updated EC is not greater than "1" (e.g., SC−EC=0), the fail cycle detection unit 104 determines that the failing cycle has been identified. Accordingly, the fail cycle detection unit 104 outputs the fail cycle alert signal 106 identifying the detected fail cycle. When, however, the fail cycle detection unit 104 determines that the difference between SC and EC is greater than "1" (e.g., SC−EC>0), the fail cycle detection unit 104 outputs a feedback signal 108 that instructs the cycle tracking unit 100 to update the TC value by commanding the cycle tracking unit 100 to set the EC to the most recently set TC. Accordingly, the cycle tracking unit 100 again performs the debugging run described above, but according to an updated TC.

Referring again to the stability analysis, when the ΔC value doesn't match for at least (k) out of (n) number of iterations, the fail cycle detection unit 104 updates the SC value as described above by setting it to the most recently set TC value. In this manner, the new SC value is brought closer toward the EC value.

After updating the SC value, the fail cycle detection unit 104 calculates the difference between the updated SC value and the current EC value as described above. When the difference between the updated SC and the EC is not greater than "1" (e.g., SC−EC=0), the fail cycle detection unit 104 determines that the failing cycle has been identified. Accordingly, the fail cycle detection unit 104 outputs the fail cycle alert signal 106 identifying the detected fail cycle. When, however, the fail cycle detection unit 104 determines that the difference between the updated SC and the current EC is greater than "1" (e.g., SC−EC>0), the fail cycle detection unit 104 outputs the feedback signal 108 that instructs the cycle tracking unit 100 to update the TC value by commanding the cycle tracking unit 100 to set the SC to the most recently set TC. Accordingly, the cycle tracking unit 100 again performs the debugging run described above, but according to an updated TC.

Figure 5:
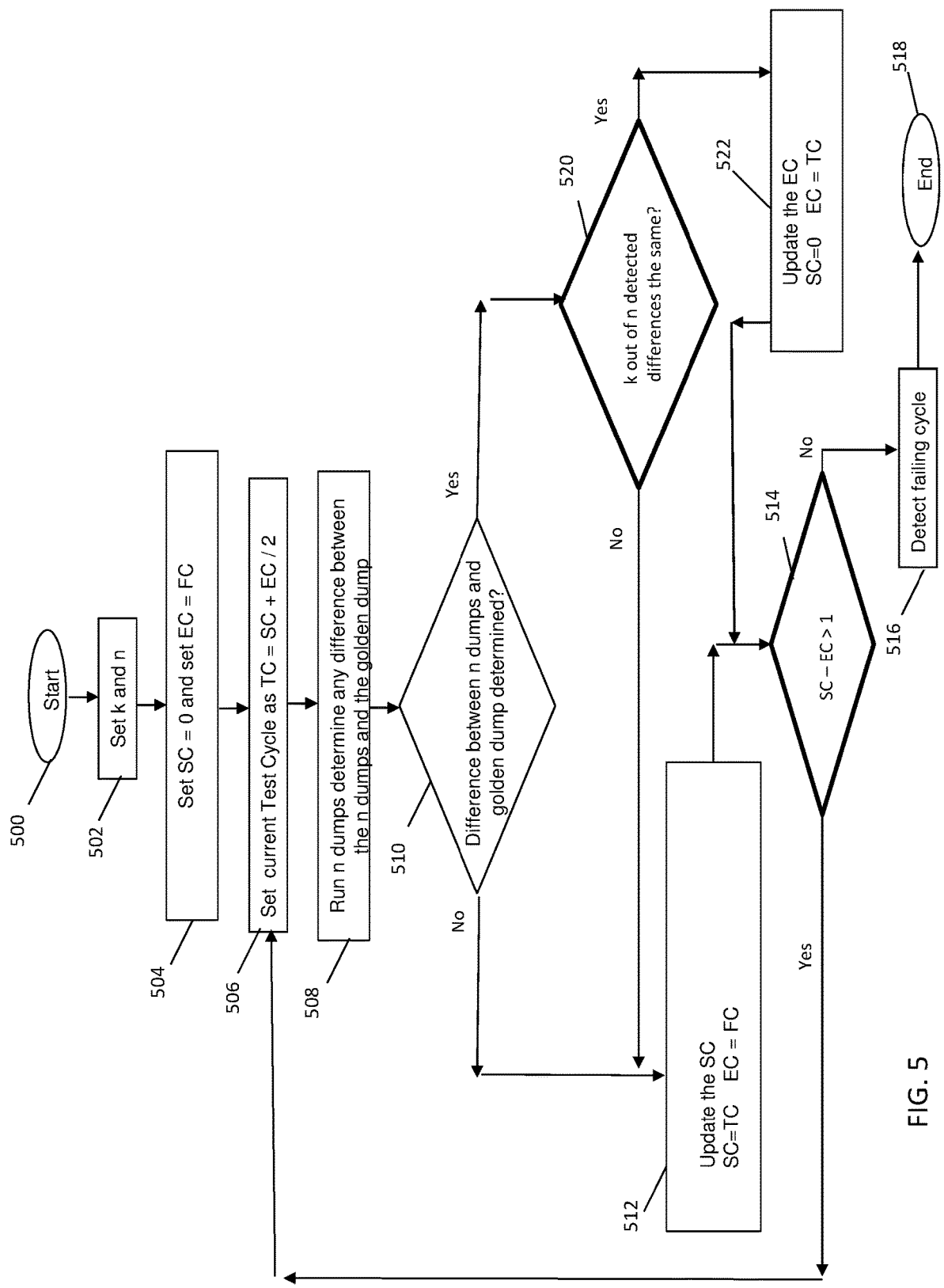
FIG. 5 depicts a flow diagram illustrating a method of performing a circuit-cycle fault reproduction operation according to one or more embodiments of the invention.

Turning now to FIG. 5, a method of performing a circuit-cycle fault reproduction operation is illustrated according to one or more embodiments of the invention. The method begins at operation 500, and at operation 502 one or more stability parameters indicating a stability factor of the processor is set. In at least one embodiment stability factor is based on an expected stability (k) a number of ring-dump comparison iterations (n). At operation 504, the initial starting cycle (SC) and initial ending cycle (EC) are set. In at least one embodiment, the initial starting cycle is set to zero ("0") and the ending cycle is set equal to a predicted failing cycle (FC). Accordingly, the test cycle range (TC) is set based on the set starting cycle and the set ending cycle at operation 506. In at least one embodiment, the test cycle range is defined as: TC=SC+EC/2.

At operation 508, a number (n) of ring dumps is executed and a difference between the n dumps and golden dump is determined. And if there is no difference with the golden dump is observed at operation 510, then the starting cycle (SC) is modified and updated at operation 512. In at least one embodiment, the starting cycle (SC) is modified by setting the starting cycle (SC) equal to the most recently calculated test cycle range (TC). At operation 514, the difference between starting cycle (SC) and the ending cycle (EC) is compared to a cycle threshold value (e.g., "1"). When the difference is greater than the threshold value, the test cycle range (TC) is modified and updated. In at least one embodiment, the test cycle range (TC) is modified by replacing the most recently set starting cycle (SC) with the new modified starting cycle (see operation 512). When, however, the difference is not greater than the threshold value, a failing cycle is detected at operation 516, and the method ends at operation 518.

Returning to operation 510, when a difference between the n dumps and the golden dump is detected, then analysis is performed to determine if k out n of detected differences are same at operation 520. When the expected stability (k) per iterations (n) does not match an expected threshold, then the starting cycle (SC) is modified and updated at operation 512.

At operation 514, the difference between the starting cycle (SC) and the ending cycle (EC) is compared to a cycle threshold value (e.g., "1"). When the difference is greater than the threshold value, the test cycle range (TC) is modified and updated. As mentioned above, the test cycle range (TC) can be modified by replacing the most recently set starting cycle (SC) with the new modified starting cycle (see operation 512). When, however, the difference is not greater than the threshold value, a failing cycle is detected at operation 516, and the method ends at operation 518.

When, however, the expected stability (k) per iterations (n) matches an expected threshold at operation 520, then the ending cycle (EC) is modified and updated at operation 522. In at least one embodiment, the ending cycle (EC) is modified by setting the ending cycle (EC) equal to the most recently calculated test cycle range (TC). At operation 514, the difference between starting cycle (SC) and the ending cycle (EC) is compared to the cycle threshold value (e.g., "1"). When the difference is greater than the threshold value, the test cycle range (TC) is modified and updated. In at least one embodiment, the test cycle range (TC) is modified by replacing the most recently set ending cycle (EC) with the new modified ending cycle (see operation 522). When, however, the difference is not greater than the threshold value, a failing cycle is detected at operation 516, and the method ends at operation 518.

As described above, various non-limiting embodiments provide a computing system capable of performing a circuit-cycle fault reproduction (C2 repro) process that accounts for circuit variability conditions. The C2 repro process leverages a stable circuit, along with one or more real-time stability factors (e.g., electrical conditions, operating voltage, power consumption, temperature conditions and/or workload conditions) as a check criteria to determine targeted cycles of interest for performing cycle reproduction. The C2 repro process described herein is capable of accelerating the rate of fault convergence depending on the real-time stability factor of the processor. Accordingly, the validity of the hardware processor can be obtained in less time.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:
1. A circuit-cycle fault reproduction system comprising:
a hardware processor configured to execute at least one computing cycle corresponding to a given number instructions;

a cycle tracking unit configured to identify at least one test cycle included in a range of computing cycles starting from at a start cycle and completing at an end cycle;

a fail cycle detection unit in signal communication with the cycle tracking unit, the fail cycle detection unit configured to identify a failed cycle among the plurality of test cycles based on a cycle difference between the starting cycle and the ending cycle, and to actively modify the range of computing cycles based on a comparison between the cycle difference and a cycle difference threshold value, wherein the cycle tracking unit changes one or both of the starting cycle and the ending cycle so as to actively reduce the range of computing cycles.

2. The system of claim 1, wherein the cycle tracking unit determines a stability factor of the processor, and actively modifies the range of computing cycles based on the stability factor and the comparison between the cycle difference and the cycle difference threshold value.

3. The system of claim 2, wherein the fail cycle detection unit commands the cycle tracking unit to set a new start cycle in response to the cycle difference exceeding the cycle difference threshold value.

4. The system of claim 3, wherein cycle tracking unit sets a stability parameter indicating the stability factor, and wherein the fail cycle detection unit commands the cycle tracking unit to set a new start cycle in response to a mismatch between the stability parameter and a stability factor threshold value.

5. The system of claim 4, wherein the fail cycle detection unit commands the cycle tracking unit to set a new end cycle in response to a match between the stability parameter and a stability factor threshold value.

6. The system of claim 5 wherein the stability factor is determined based on at least one of an operating voltage of the processor, a power consumption of the processor, and a temperature condition of the processor.

7. A computer-implemented method for performing a circuit-cycle fault reproduction process, the method comprising:

executing, via a hardware processor, at least one computing cycle corresponding to a given number instructions;

identifying, via a cycle tracking unit, at least one test cycle included in a range of computing cycles starting from at a start cycle and completing at an end cycle;

actively modifying the range of computing cycles based on a comparison between a cycle difference and a cycle difference threshold value, the cycle difference calculated as a difference value between the starting cycle and the ending cycle; and identifying, via a fail cycle detection unit, a failed cycle among the range of computing cycles based on a cycle difference, wherein the cycle tracking unit changes one or both of the starting cycle and the ending cycle so as to actively reduce the range of computing cycles.

8. The computer-implemented method of claim 7, wherein actively modifying the range of computing cycles comprises changing one or both of the starting cycle and the ending cycle.

9. The computer-implemented method of claim 8, further comprising:

determining, via the cycle tracking unit, a stability factor of the processor; and actively modifying the range of computing cycles based on the stability factor and the comparison between the cycle difference and the cycle difference threshold value.

10. The computer-implemented method of claim 9, wherein actively modifying the range of computing cycles further comprises commanding, via the fail cycle detection unit, the cycle tracking unit to set a new start cycle in response to the cycle difference exceeding the cycle difference threshold value.

11. The computer-implemented method of claim 10, further comprising:

setting, via the cycle tracking unit, a stability parameter indicating the stability factor; and commanding the cycle tracking unit to set a new start cycle in response to a mismatch between the stability parameter and a stability factor threshold value.

12. The computer-implemented method of claim 11, wherein the fail cycle detection unit commands the cycle tracking unit to set a new end cycle in response to a match between the stability parameter and a stability factor threshold value.

13. The computer-implemented method of claim 12, wherein the stability factor is determined based on at least one of an operating voltage of the processor, a power consumption of the processor, and a temperature condition of the processor.

14. A computer program product for performing a circuit-cycle fault reproduction process, the computer program product comprising a computer readable storage medium having program instructions embodied therewith, the program instructions executable by a processor to cause the processor to perform a method comprising:

executing, via a hardware processor, at least one computing cycle corresponding to a given number instructions;

identifying, via a cycle tracking unit, at least one test cycle included in a range of computing cycles starting from at a start cycle and completing at an end cycle;

actively modifying the range of computing cycles based on a comparison between a cycle difference and a cycle difference threshold value, the cycle difference calculated as a difference value between the starting cycle and the ending cycle; and identifying, via a fail cycle detection unit, a failed cycle among the range of computing cycles based on a cycle difference, wherein the cycle tracking unit changes one or both of the starting cycle and the ending cycle so as to actively reduce the range of computing cycles.

15. The computer program product of claim 14, further comprising:

determining, via the cycle tracking unit, a stability factor of the processor; and actively modifying the range of computing cycles based on the stability factor and the comparison between the cycle difference and the cycle difference threshold value.

* * * * *